United States Patent
Zhong

(10) Patent No.: US 6,197,913 B1
(45) Date of Patent: Mar. 6, 2001

(54) METHOD FOR MAKING MICROPOROUS SILICONE RESINS WITH NARROW PORE-SIZE DISTRIBUTIONS

(75) Inventor: Bianxiao Zhong, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/383,647

(22) Filed: Aug. 26, 1999

(51) Int. Cl.[7] .................................................. C08G 77/06
(52) U.S. Cl. .............................. 528/31; 528/35; 427/226; 427/228
(58) Field of Search ................. 528/31, 35; 427/226, 427/228

(56) References Cited

U.S. PATENT DOCUMENTS

| | | | |
|---|---|---|---|
| 3,372,178 | * 3/1968 | Wu | 260/448.2 |
| 3,615,272 | 10/1971 | Collins et al. | 23/366 |
| 4,198,131 | * 4/1980 | Birdsall et al. | 351/160 R |
| 4,756,977 | 7/1988 | Haluska et al. | 428/704 |
| 5,227,448 | * 7/1993 | Durfee | 528/15 |
| 5,380,555 | * 1/1995 | Mine et al. | 427/226 |
| 5,494,859 | 2/1996 | Kapoor | 437/235 |
| 5,723,257 | * 3/1998 | Iwasa | 430/270.1 |
| 5,776,990 | 7/1998 | Hedrick et al. | 521/77 |
| 5,935,638 | * 8/1999 | Chandra et al. | 427/58 |

FOREIGN PATENT DOCUMENTS

| | | | |
|---|---|---|---|
| 10-287746 | 10/1998 | (JP) | C08G/77/04 |
| WO 98/49721 | 11/1998 | (WO) | H01L/21/316 |

OTHER PUBLICATIONS

Mikoskiba et al., J. Mat. Chem., "Preparation of Low Density Poly(methylsilsesquioxane)s LSI for Interlayer Dielectrics With Low Dielectric Constant. Fabrication of Angstrom Size Pores Prepared By Baking Trifluoropropylsilyl Copolymers," 1999, 9, 591–598.

* cited by examiner

Primary Examiner—Margaret G. Moore
(74) Attorney, Agent, or Firm—William F. Boley

(57) ABSTRACT

A method for preparing a microporous silicone resin which can be used to form low dielectric constant films useful for electrical insulating coatings on electronic devices comprising (A) contacting a hydridosilicon containing resin with an alkenyltriarylsilane in the presence of a platinum group metal-containing hydrosilation catalyst effecting formation of a silicon resin where at least 5 percent of silicon atoms are substituted with at least one triarylsilylalkylene group and at least 45 percent of silicon atoms are substituted with at least one hydrogen atom and (B) heating the silicon resin of step (A) in an inert atmosphere at a temperature sufficient to effect thermolysis of the triarylsilylalkylene groups from the silicon atoms.

22 Claims, No Drawings

METHOD FOR MAKING MICROPOROUS SILICONE RESINS WITH NARROW PORE-SIZE DISTRIBUTIONS

BACKGROUND OF INVENTION

The present invention relates generally to a method for making microporous silicone resins which are useful for forming low dielectric constant films. More specifically, the present invention is a method for making a microporous silicone resin having a narrow pore size range by hydrosilating a hydridosilicon containing resin with an alkenyltriarylsilane, coating the hydrosilated resin on a substrate, and heating the coated substrate in an inert atmosphere to effect thermolysis of the aryl substituents and their elimination from the coating as a gas.

Semiconductor devices often have one or more arrays of patterned interconnect levels that serve to electrically couple the individual circuit elements forming an integrated circuit (IC). These interconnect levels are typically separated by an insulating or dielectric film. Previously, a silicon oxide film formed using chemical vapor deposition (CVD) or plasma enhanced techniques (PECVD) was the most commonly used material for such dielectric films. However, as the size of circuit elements and the spaces between such elements decreases, the relatively high dielectric constant of such silicon oxide films is inadequate to provide adequate electrical insulation.

In order to provide a lower dielectric constant than that of silicon oxide, dielectric films formed from siloxane-based resins have found use. An example of such films are those formed from poly(hydrogen)silsesquioxane resins as described for example in Collins et al., U.S. Pat. No. 3,615,272 and Haluska et al. U.S. Pat. No. 4,756,977. While such films provide lower dielectric constants than CVD or PECVD silicon oxide films and also provide other benefits such as enhanced gap filling and surface planarization, typically the dielectric constants of such films are limited to approximately 3 or greater.

It is well known that the dielectric constant of the above discussed insulating films is an important factor where IC's with low power consumption, cross-talk, and signal delay are required. As IC dimensions continue to shrink, this factor increases in importance. As a result, siloxane based resin materials and methods for making such materials that can provide electrically insulating films with dielectric constants below 3 are desirable. In addition it is desirable to have siloxane-based resins and method for making such resins that provide low dielectric constant films which have a high resistance to cracking. Also, it is desirable for such siloxane-based resins to provide low dielectric constant films by standard processing techniques.

It is known that the dielectric constant of solid films decrease with a decrease in density of the film material. Therefore considerable work is being conduct to develop microporous insulating films for use on semiconductor devices.

Kapoor, U.S. Pat. No. 5,494,859, describes a low dielectric constant insulating layer for an integrated circuit structure and a method of making the layer. A porous layer is formed by depositing on a structure a composite layer comprising an insulating matrix material and a material which can be converted to a gas upon subjection to a converting process. Release of the gas leaves behind a porous matrix of the insulating material which has a lower dielectric constant than the composite layer. The matrix forming material is typically silicon oxide and the material which can be converted to a gas upon subjection to a converting process is exemplified by carbon.

Hedrick et al., U.S. Pat. No. 5,776,990, describe an insulating foamed polymer having a pore size less than about 100 nm made from a copolymer comprising a matrix polymer and a thermally decomposable polymer by heating the copolymer above the decomposition temperature of the decomposable polymer. The copolymers described are organic polymers that do not contain silicon atoms.

Smith et al., WO 98/49721, describe a process for forming a nanoporous dielectric coating on a substrate. The process comprises the steps of blending an alkoxysilane with a solvent composition and optional water; depositing the mixture onto a substrate while evaporating at least a portion of the solvent; placing the substrate in a sealed chamber and evacuating the chamber to a pressure below atmospheric pressure; exposing the substrate to water vapor at a pressure below atmospheric pressure and then exposing the substrate to base vapor.

Mikoshiba et al., Japanese Laid-Open Patent (HEI) 10-287746, describe the preparation of porous films from siloxane-based resins having organic substituents which are oxidized at a temperature of 250° C. or higher. The useful organic substituents which can be oxidized at a temperature of 250° C. or higher given in this document include substituted and unsubstituted groups as exemplified by 3,3,3-trifluoropropyl, β-phenethyl group, t-butyl group, 2-cyanoethyl group, benzyl group, and vinyl group.

Mikoskiba et al., J Mat. Chem., 1999, 9, 591–598, report a method to fabricate angstrom size pores in poly(methylsilsesquioxane) films in order to decrease the density and the dielectric constant of the films. Copolymers bearing methyl(trisiloxysilyl) units and alkyl (trisiloxysilyl) units are spin-coated on to a substrate and heated at 250° C. to provide rigid siloxane matrices. The films are then heated at 450° C. to 500° C. to remove thermally labile groups and holes are left corresponding to the sized of the substituents. Trifluoropropyl, cyanoethyl, phenylethyl, and propyl groups were investigated as the thermally labile substituents.

SUMMARY OF INVENTION

The present invention is a method for preparing a microporous silicone resin which can be used to form low dielectric constant films useful for electrical insulating coatings on electronic devices. The method comprises (A) contacting a hydridosilicon containing resin with an alkenyltriarylsilane in the presence of a platinum group metal-containing hydrosilation catalyst effecting formation of a silicon resin where at least 5percent of silicon atoms are substituted with at least one triarylsilylalkylene group and at least 45 percent of silicon atoms are substituted with at least one hydrogen atom and (B) heating the silicon resin of step (A) in an inert atmosphere at a temperature sufficient to effect thermolysis of the triarylsilylalkylene groups from the silicon atoms.

DESCRIPTION OF INVENTION

The present invention is a method for preparing a microporous silicone resin which can be used to form low dielectric constant films useful for electrical insulating coatings on electronic devices. The method comprises (A) contacting a hydridosilicon containing resin with an alkenyltriarylsilane described by formula $$Ar_3Si(CH_2)_{p-2}CH=CH_2 \quad (1)$$

in the presence of a platinum group metal-containing hydrosilation catalyst effecting formation of a silicon resin where at least 5 percent of silicon atoms are substituted with at least one triarylsilylalkylene group described by formula $$Ar_3Si(CH_2)_{p^-} \quad (2)$$

and at least 45 percent of silicon atoms are substituted with at least one hydrogen atom and (B) heating the silicon resin of step (A) in an inert atmosphere at a temperature sufficient to effect thermolysis of the triarylsilylalkylene groups from the silicon atoms; where each Ar is an independently selected aryl group and p=2 to 20.

The hydridosilicon containing resin can be any of those known in the art where at least 50 percent of the silicon atoms have a hydrogen substitution and as such can be homopolymers or copolymers. The following nonlimiting list of possible hydrolysates and co-hydrolysates are, however, specifically contemplated:

$(HSiO_{3/2})_n$,
$(H_2SiO)_m$,
$(HSiO_{3/2})x(R^1SiO_{3/2})y$,
$(HSiO_{3/2})x(R'R^2SiO)y$,
$(HSiO_{3/2})x(R'R^2SiO)y(SiO_2)z$, and
$(HSiO_{3/2})x(H_2SiO)y$;

where $R^1$ is a substituent which is not removed by heating at a temperature up to about 600° C., $R^2$ is either $R^1$ or hydrogen, $n \geq 2$, $m \geq 3$, the mole fractions of x, y, and z must total 1 in each of the copolymers, and x is at least 50 percent of the sum of x, y, and z. Examples of $R^1$ include methyl, ethyl, and phenyl. Hydridosilicon containing resins useful in the present process and their methods for preparation can be those described, for example in Collins et al. U.S. Pat. No. 3,615,272; Hanneman et al., U.S. Pat. No. 5,063,267; and Bank et al., U.S. Pat. No. 5,010,159; all of which are hereby incorporated by reference. Preferred is when the hydridosilicon containing resin is described by formula $(HSiO_{3/2})n$, where n is as described above and n is preferably within a range of about 100 to 1000.

It is preferred that the hydridosilicon resin be diluted in an organic solvent that is not detrimental to the hydrosilation reaction. The organic solvent can be generally any non-aromatic organic solvent that does not contain carbon-carbon unsaturated bonds and aromatic solvents. The organic solvent can be substituted or unsubstituted. Examples of useful organic solvents include alkanes such as dodecane, n-pentane, hexane, n-heptane, and isooctane; cycloalkanes such as cyclopentane and cyclohexane; aromatics such as benzene, toluene, xylene, and mesitylene; ketones such as methylisobutylketone; halogen substituted alkanes such as trichloroethane; and halogen substituted aromatics such as bromobenzene and chlorobenzene. Additionally, combinations of the above organic solvents may be used together as cosolvents for the hydridosilicon containing resin. The preferred organic solvents are aromatic compounds because of their high volatility, with toluene and mesitylene being most preferred because of their safety profile.

It is preferred that the hydridosilicon containing resin be diluted in the organic solvent at a weight percent within a range of about 5 to 60 weight percent of the solution comprising the resin and organic solvent. More preferred is when the hydridosilicon containing resin is diluted in the organic solvent at a weight percent within a range of about 10 to 30 weight percent on the same basis.

In the present method the hydridosilicon containing resin is contacted with an alkenyltriarylsilane described by formula (1). In formula (1), Ar represents an independently selected aryl group as exemplified by phenyl, tolyl, xylyl, and naphthyl. Preferred is when each Ar is phenyl. The alkenyltriarylsilane described by formula (1) comprises an alkenyl substituent comprising 2 to 20 carbon atoms (i.e. p=2 to 20) and having an end-terminal unsaturated carbon-carbon bond. Preferred is when the alkenyl substituent comprises 3 to 15 carbon atoms (i.e. p=3 to 15).

It is necessary in the present method that after the hydrosilation reaction at least about 45 percent of the silicon atoms remain substituted with at least one hydrogen atom to retain curing ability of the silicon resin. Generally, this amount of hydrogen atoms bonded to silicon atoms in the silicon resin can be achieved by adding an amount of alkenyltriarylsilane to the present method such that the mole ratio of the alkenyltriarylsilane to silicon-bonded hydrogen in the hydridosilicon containing resin is within a range of about 0.05:1 to 0.7:1, with a range of about 0.1:1 to 0.5:1 being preferred.

The present method requires the presence of a platinum group metal-containing hydrosilation catalyst. The platinum group metal-containing hydrosilation catalyst can be any of those known in the art to effect a hydrosilation reaction between a silicon-bonded hydrogen atom and an unsaturated carbon-carbon bond. By "platinum group metal" it is meant ruthenium, rhodium, palladium, osmium, iridium, and platinum, with platinum being preferred. Examples of platinum group metal-contain catalysts which may be useful in the present invention are described for example in Willing, U.S. Pat. No. 3,419,593; Lee et al., U.S. Pat. No. 3,989,668; Chang et al., U.S. Pat. No. 5,036,117; Ashby, U.S. Pat. No. 3,159,601; Lamoreaux, U.S. Pat. No. 3,220,972; Chalk et al., U.S. Pat. No. 3,296,291; Modic U.S. Pat. No. 3,516,946; Karstedt, U.S. Pat. No. 3,814,730; and Chandra et al., U.S. Pat. No. 3,928,629 all of which are hereby incorporated by reference to show platinum group metal containing catalysts and methods for their preparation which may be useful in the present method. A preferred platinum group metal-containing catalyst is a complex of platinum with 1,3-dietheny1-1,1,3,3-tetramethyldisiloxane.

The amount of platinum group metal-containing catalyst useful in the present method is not narrowly limited as long as there is a sufficient amount present to accelerate a reaction between silicon-bonded hydrogen atoms and the alkenyl substituent of the alkenyltriarylsilane. The appropriate amount of the platinum group metal containing catalyst will depend upon the particular catalyst used. In general as low as about 0.001 part by weight of platinum group metal for every million parts by weight of components present in Step (A), including any solvent when present, may be useful. Preferably the amount of platinum group metal is at least about 1 ppm on the same basis, with about 10 to 100 ppm being more preferred, and 20 to 60 ppm being most preferred.

The temperature at which the hydridosilicon containing resin is contacted with the alkenyltriarylsilane is not critical as long as it does not effect significant gelation or curing of the silicon resin product. Generally the temperature can be within a range of about 20° C. to 150° C. with a temperature within a range of about 50° C. to 100° C. being preferred.

In step (A) of the present method a silicon resin is formed where at least 5 percent of the silicon atoms are substituted with at least one triarylsilylalkylene group described by formula (2) and at least 45 percent of silicon atoms are substituted with at least one hydrogen atom. Preferred is where about 10 to 25 percent of the silicon atoms are substituted with at least one triarylsilylalkylene group described by formula (2) and at least 45 percent of the silicon atoms are substituted with at least one hydrogen atom.

In step (B) of the present method the silicon resin of step (A) is heated in an inert atmosphere at a temperature sufficient to effect thermolysis of the triarylsilylalkylene groups from the silicon atoms. The heating may be conducted as a single-step process or as a two-step process. In the two-step process the silicon resin is first heated in an inert atmosphere at a temperature sufficient to effect curing without significant thermolysis of the triarylsilylalkylene groups from the silicon atoms. Generally this temperature can be in a range of from about 20° C. to 350 C. Then, the cured silicon resin is further heated at a temperature within a range of greater than 350° C. up to the lessor of the decomposition temperature of the silicon resin polymer backbone or $R^2$ substituents (as described above) on the silicon atoms to effect thermolysis of the tiarylsilylalkylene groups from the silicon atoms. Generally, it is preferred that the thermolysis step be conducted at a temperature in a range of greater than 350° C. to about 600° C., with a temperature in a range of about 400° C. to 550° C. being most preferred. In the single-step heating process the curing of the resin and thermolysis of the triarylsilylalkylene groups are effected simultaneously by heating the silicon resin to a temperature within a range of greater than 350° C. up to the lessor of the decomposition temperature of the silicon resin polymer backbone or $R^2$ substituents on the silicon atoms. Generally, it is preferred that the single-step method of heating be conducted at a temperature in a range of greater than 350° C. to about 600° C., with a temperature in a range of about 400° C. to 550° C. being most preferred.

The present method requires that the heating of step (B) be conducted in an inert atmosphere. The inert atmosphere is necessary because the presence of oxygen may oxidize Si-H bonds and cause destruction of the resin framework at high temperatures resulting in an increase DK for the resin. The inert atmosphere can be any of those known in the art, for example argon, helium, or nitrogen.

The microporous silicone resins formed by the present method are particularly useful as low dielectric films on electronic devices such is integrated chips. The silicon resins of the invention can generally be applied to the surface of electronic devices in the form of a dilute solvent solution by methods such as spin coating, dip coating, spray coating, or flow coating. The solvent is then allowed to evaporate by drying to form a homogeneous resin which is then heated as described above to cure and provide for a microporous silicone resin having a dielectric constant less than about 3. The useful solvents can be the same as those described above for use in the hydrosilation step.

DETAILED DESCRIPTION

The following examples are provide to illustrate the present invention. These examples are not intend to limit the scope of the claims herein.

EXAMPLE 1

A two step process was performed. In Step 1, 2 weight parts of 50 weight percent poly (hydrogen) silsesquioxane resin in xylene and 0.8 weight part of vinyltriphenylsilane were reacted at 100° C. in the presence of 5×10⁻⁵ weight part of Pt in the form of a complex with 1,3-diethenyl-1,1,3,3-tetramethyldisiloxane for 20 minutes. In Step II, a 2 g sample of the hydrosilated resin formed in Step 1 was place into a crucible and cured at 400° C. in nitrogen for 1 hour and in nitrogen at 600° C. for 1 hour. The resulting solid was tested for nitrogen adsorption at 77°K using a Micromeritics ASAP 2000 Accelerated Surface Area and Porosimetry System. The BET surface area was determined to be 342 m²/g. H-K analysis (Horvath, *J. Chem. Eng. Jpn.,* 1983, Vol. 16, page 476) of the adsorption data indicated that the solid had a micropore volume of 0.16 cc/g corresponding to 19 volume percent of porosity and a narrow pore size distribution with a media pore size of 0.52 nm.

EXAMPLE 2

Two weight parts of 50 weight percent poly (hydrogen) silsesquioxane resin in xylene and 0.4 weight part of vinyltriphenylsilane were reacted, cured, and heated as described in Example 1. The resulting material was a microporous resin having a BET surface area of 280m²/g.

EXAMPLE 3

(Comparison example)

Two weight parts of 50 weight percent poly (hydrogen) silsesquioxane resin in xylene and 0.8 weight parts of isobornyl methacrylate were reacted, cured, and heated as described in Example 1. The resulting material was a slightly porous material having a BET surface area of 78 m²/g.

EXAMPLE 4

(Comparison example)

Two weight parts of 50 weight percent poly (hydrogen) silsesquioxane resin in xylene and 0.8 part of tributylsilane were reacted, cured, and heated as described in Example 1. The resulting material was a non-porous material with a BET surface area of 0.8 m²/g.

EXAMPLE 5

An aluminum panel was coated with the product of Step 1 of Example 1 and heated at 600° C. in nitrogen for 0.5 hour. A clear microporous film was formed with no observable cracks.

EXAMPLE 6

A resin was made according to the process described in Step 1 of Example 1, except that the xylene was replaced with toluene and reaction was carried out at 90° C. of 25 minutes. Then, 4.4 weight parts of toluene were added to the reaction product and a thin film was prepared by spin coating on a silicon wafer. The coated wafer was heated in a nitrogen atmosphere at 450° C. for 20 minutes. The resulting film had a thickness of 0.6 micron and a dielectric constant of 2.6. There were no observable cracks in the film.

What is claimed is:

1. A method for preparing a microporous silicone resin comprising heating in an inert atmosphere a silicone resin where at least 5 percent of silicon atoms are substituted with at least one triarylsilylalkylene group described by formula $Ar_3Si(CH_2)_p$- and at least 45 percent of silicon atoms are substituted with at least one hydrogen atom, at a temperature sufficient to effect thermolysis of the triarylsilylalkylene groups from the silicon atoms, where each Ar is an independently selected aryl group and p=2 to 20.

2. A method according to claim 1, where any remaining valences of the silicon atoms are bonded to oxygen atoms, hydroxy groups, or a substituent $R^1$ which is not removed by heating at a temperature up to about 600° C.

3. A method according to claim 1, where about 10 to 25 percent of the silicon atoms are substituted with at least one of the triarylsilylalkylene groups.

4. A method according to claim 1, where each Ar is independently selected from the group consisting of phenyl, tolyl, xylyl, and naphthyl.

5. A method according to claim 1, where Ar is phenyl and p=3 to about 15 carbon atoms.

6. A method according to claim 1, where the temperature is in a range greater than 350° C. to about 600° C.

7. A method according to claim 1, where the temperature is in a range of about 400 ° C. to 550 ° C.

8. A method for preparing a microporous silicone resin comprising (A) contacting a hydridosilicon containing resin with an alkenyltriarylsilane described by formula $Ar_3Si(CH_2)_{p-2}CH=CH_2$ in the presence of a platinum group metal hydrosilation catalyst effecting formation of a silicone resin where at least 5 percent of silicon atoms are substituted with at least one triarylsilylalkylene group described by formula $Ar_3Si(CH_2)_{p-}$ and at least 45 percent of silicon atoms are substituted with at least one hydrogen atom and (B) heating the silicon resin of step (A) at a temperature sufficient to effect thermolysis of the triarylsilylalkylene groups from the silicon atoms; where each Ar is an independently selected aryl group and p=2 to 20.

9. A method according to claim 8, where any remaining valences of the silicon atoms of the silicone resin are bonded to oxygen atoms, hydroxy groups, or a substituent $R^1$ which is not removed by heating at a temperature up to about 600° C.

10. A method according to claim 8, where the hydridosilicon containing resin has a general formula selected from the group of $(HSiO_{3/2})n$, $(H_2SiO)m$, $HSiO_{3/2})_x(R^1SiO_{3/2})_y$, $(HSiO_{3/2})_x(R^1R^2SiO)_y$, $(HSiO_{3/2})_x(R^1R^2SiO)_y(SiO_2)_z$, and $(HSiO_{3/2})_x(H_2SiO)_y$;

where $R^1$ is a substituent which is not removed by heating at a temperature up to about 600°C., $R^2$ is either $R^1$ or hydrogen, $n \geq 2$, $m \geq 3$, the mole fractions of x, y, and z must total 1 in each of the copolymers, and x is at least 50 percent of the sum of x, y, and z.

11. A method according to claim 10, where each $R^1$ is independently selected from the group consisting of methyl, ethyl, and phenyl.

12. A method according to claim 10, where the hydridosilicon containing resin is described by formula $(HSiO_{3/2})_n$ and n is within a range of about 100 to 1000.

13. A method according to claim 8, where each Ar is independently selected from the group consisting of phenyl, tolyl, xylyl, and naphthyl.

14. A method according to claim 8, where Ar is phenyl.

15. A method according to claim 8, where p=3 to 15.

16. A method according to claim 8 having a mole ratio of the alkenyltriarylsilane to silicon-bonded hydrogen in the hydridosilicon containing resin within a range of about 0.05:1 to 0.7:1.

17. A method according to claim 8 having a mole ratio of the alkenyltriarylsilane to silicon-bonded hydrogen in the hydridosilicon containing resin within a range of about 0.1:1 to 0.5:1.

18. A method according to claim 8, where the hydridosilicon containing resin is contacted with the alkenyltriarylsilane at a temperature within a range of about 50° C. to 100 ° C.

19. A method according to claim 8, wshere about 10 to 25 percent of the silicon atoms of the silicone resin are substituted with a least one triarylsilylalkylene group.

20. A method according to claim 8, where the heating of Step (B) is conducted at a temperature in a range of greater than 350° C. to about 600° C.

21. A method according to claim 8, where the heating of Step (B) is conducted at a temperature in a range of about 400° C. to 550° C.

22. A method according to claim 8, where Step (A) and Step (B) are combined in a single heating step at a temperature in a range of about 400° C. to 550° C.

* * * * *